(12) United States Patent
Seigler et al.

(10) Patent No.: US 8,811,128 B1
(45) Date of Patent: Aug. 19, 2014

(54) GENERATING SURFACE PLASMONS USING ELECTRICAL CURRENT

(71) Applicant: Seagate Technology LLC, Cupertino, CA (US)

(72) Inventors: Michael Allen Seigler, Eden Pairie, MN (US); Mark William Covington, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/789,397

(22) Filed: Mar. 7, 2013

(51) Int. Cl.
*G11B 11/00* (2006.01)
*G11B 13/04* (2006.01)

(52) U.S. Cl.
CPC .................................. *G11B 13/04* (2013.01)
USPC .................. 369/13.33; 369/13.13; 369/112.27

(58) Field of Classification Search
CPC ................ G11B 5/3133; G11B 5/314; G11B 2005/0021; G11B 5/6088; G11B 2005/001; G11B 7/1387; G11B 7/1384; G11B 7/1206
USPC .......... 369/13.33, 13.32, 13.24, 13.03, 13.12, 369/112.27, 13.02, 13.13; 360/59
See application file for complete search history.

(56) References Cited

U.S. PATENT DOCUMENTS 8,009,545 B2 * 8/2011 Buechel et al. .......... 369/112.27
8,553,506 B2 * 10/2013 Contreras et al. .......... 369/13.33

OTHER PUBLICATIONS

Lambe et al., "Light Emission from Inelastic Electron Tunneling" Physical Review Letters, vol. 37, No. 14, Oct. 4, 1975, pp. 923-925.
Davis, "Theory of surface-plasmon excitation in metal-insulator-metal tunnel junctions", Physical Review B, vol. 16, No. 6, Sep. 15, 1977, pp. 2482-2490.
Van Wijngaarden, "Cathodoluminescence Imaging Spectroscopy on Plasmonic Structures", The Center for Nanophotonics FOM-Institute AMOLF Amsterdam, Research project for the masters degree in Experimental Physics at Utrecht University Aug. 2004-Aug. 2005, 47 pages.
SolidState Technology, "What challenges remain to achieve heat-assisted magnetic recording?" http://www.electroiq.com/articles/sst/print/volume-50/issue-9/supplem...at-challenges-remain-to-achieve-heat-assisted-magnetic-recording.html, downloaded Apr. 3, 2012, pp. 1-7.
Challener et al., "Heat-assisted magnetic recording by a near-filed transducer with efficient optical energy transfer", Nature Photonics, vol. 3, Apr. 2009, www.nature.com/naturephotonics, Macmillan Publishers Limited, pp. 220-224.
Kryder et al., "Heat Assisted Magnetic Recording", Proceedings of the IEEE, vol. 96, No. 11, Nov. 2008, pp. 1810-1835.
Van Wijngaarden et al, "Direct imaging of propagation and damping of near-resonance surface plasmon polaritons using cathodoluminescence spectroscopy", Applied Physics Letter 88, 221111 (2006), 3 pages.
Kuttge et al., "Loss mechanism of surface plasmon polaritons on gold probed be cathodoluminescence imaging spectroscopy", Applied Physics Letters 93, 113110 (2008), 3 pages.

\* cited by examiner

*Primary Examiner* — Ali Neyzari
(74) *Attorney, Agent, or Firm* — HolzerIPLaw, PC

(57) ABSTRACT

A device comprises a near field transducer (NFT) and electrodes configured to at least one of generate or enhance surface plasmons in the NFT by passing electrical current through a portion of the NFT.

18 Claims, 5 Drawing Sheets

GENERATING SURFACE PLASMONS USING ELECTRICAL CURRENT

BACKGROUND

Heat assisted magnetic recording (HAMR) generally refers to the concept of locally heating a recording medium to reduce the coercivity of the medium. Such reduced coercivity allows the applied magnetic writing fields to more easily direct the magnetization within the recording medium during the temporary magnetic softening caused by the heat source. HAMR allows for the use of small grain media, with a larger magnetic anisotropy at room temperature to assure sufficient thermal stability, which is desirable for recording at increased areal densities. HAMR can be applied to any type of magnetic storage media including tilted media, longitudinal media, perpendicular media, and patterned media. By heating the media, the $K_u$ or coercivity is reduced such that the magnetic write field is sufficient to write to the media. Once the media cools to ambient temperature, the coercivity has a sufficiently high value to assure thermal stability of the recorded information. Better designs are needed to increase efficiency, alignment, precision, and reduced size of the local heating.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

A device comprises a near field transducer (NFT) and electrodes configured to at least one of generate or enhance surface plasmons in the NFT by passing electrical current through a portion of the NFT.

BRIEF DESCRIPTION OF THE DRAWINGS

The described technology is best understood from the following Detailed Description describing various implementations read in connection with the accompanying drawings.

DETAILED DESCRIPTION

Methods of heat-assisted magnetic recording (HAMR) include locally heating the media using the fringing electrical fields from optical frequency surface plasmons generated by a near-field transducer (NFT). These fringing fields can be localized well below the diffraction limit of visible light. However, there are problems with this approach. The efficiency of the NFT is lower than desired. Furthermore, a laser diode may be required to use this approach, which adds to the mechanical structure and the size of the equipment supporting this approach. Additionally, high quality optics, such as waveguide materials, gratings, perpendicular sidewalls, etc., may also be required.

An implementation of HAMR device and disclosed herein generates surface plasmons in the form or collective oscillations of free electron gas at optical frequencies. In one implementation, surface plasmons are generated by passing an electrical current through a near field transducer (NFT). The surface plasmons may be in the form of electrons moving back and forth through a medium. In an alternative implementation, the oscillations of the surface plasmons are enhanced by passing electrical current though an NFT. For example, passing the electrical current through the NFT is timed so as to add to the momentum of the waves of the electrons in the surface plasmons.

Figure 1:
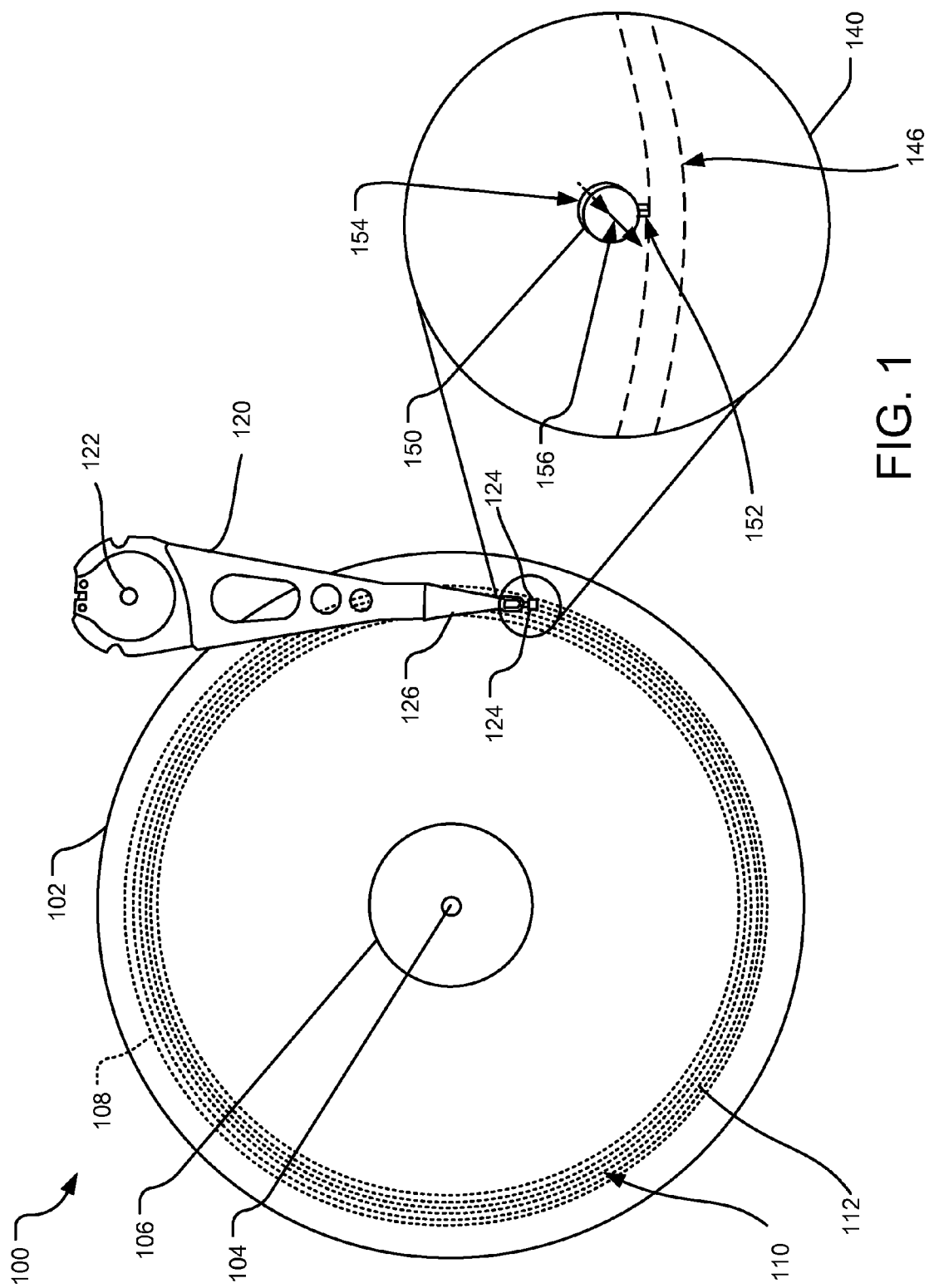
FIG. 1 illustrates a perspective view of an example recording device including a transducer head using an NFT according to the implementations disclosed herein.

FIG. 1 illustrates a perspective view of an example recording device 100 including a transducer head using an NFT according to the implementations disclosed herein. The recording device 100 includes a disc 102, which rotates about a spindle center or a disc axis of rotation 104 during operation. The disc 102 includes an inner diameter 106 and an outer diameter 108 between which are a number of concentric data tracks 110, illustrated by circular dashed lines. The data tracks 110 are substantially circular and are made up of regularly spaced patterned bits 112, indicated as dots or ovals on the disc 102 as well as in an exploded view 140. It should be understood, however, that the described technology may be employed with other types of storage media, including continuous magnetic media, discrete track (DT) media, etc.

Information may be written to and read from the bits 112 on the disc 102 in different data tracks 110. A transducer head 124 is mounted on an actuator assembly 120 at an end distal to an actuator axis of rotation 122 and the transducer head 124 flies in close proximity above the surface of the disc 102 during disc operation. The actuator assembly 120 rotates during a seek operation about the actuator axis of rotation 122 positioned adjacent to the disc 102. The seek operation positions the transducer head 124 over a target data track of the data tracks 110.

The exploded view 140 illustrates data tracks 146 and a NFT 150 located on the transducer head 124 (not to scale). The NFT 150 is an example of a disc/pin combination NFT. The term "pin" and "peg" are used herein interchangeably. The NFT 150 may be positioned at focal point of a waveguide (not shown) where it can couple with incident waves from the waveguide to generate surface plasmons on the tracks 146. The NFT 150 includes a pin 152 and a disc 154, wherein the disc 152 focuses such surface plasmons at a specific location on the tracks 146. The fields generated by the surface plasmons interact with the recording medium on the tracks 146 and transfer electromagnetic energy into the medium that heat a small region on the recording medium.

The disc/pin NFT 150, also known as a lollipop NFT has surface plasmons along the perimeter of the disc 154. However, there are little or no surface plasmons at the center of the disc 154. In an implementation of the recording device 100, an electric current is passed through the center of the disc 154. Specifically, an electric current is passed in the direction illustrated by an arrow that is perpendicular to the surface of the disc 154. As a result, resonance is generated in the surface plasmons generated by the NFT 152. In one implementation, a current carrying conductor may be passing through the center of the disc 154. In an alternate implementation, tunneling barrier effect may be generated at the center of the disc 154 to impart a particular mode to the plasmons generated by the NFT 152. Specifically, the tunneling barrier may be effected at the center of the disc 154 to excite the surface plasmons on the NFT 150.

Figure 2:
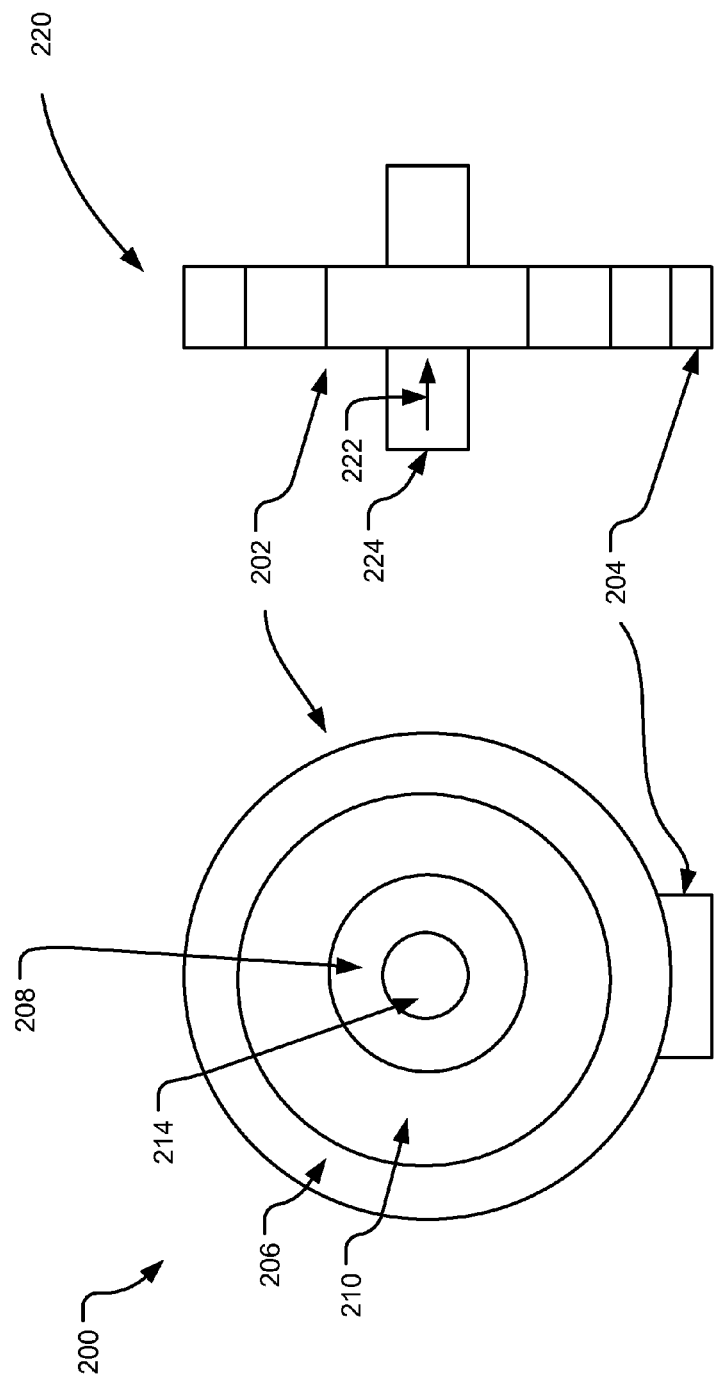
FIG. 2 illustrates cross-sectional views of an example NFT implementation disclosed herein.

FIG. 2 illustrates top-down and cross-sectional views of an example NFT implementation. Specifically, FIG. 2 illustrates a top-down view 200 and a cross-sectional view 220 of an NFT. The NFT illustrated in FIG. 2 is a disc/pin or lollipop type NFT that includes a disc 202 and a pin 204. The disc 202 may be made of a thin film structure. The NFT illustrated in FIG. 2 has the surface plasmons excited in a cylindrical mode. In this mode, the surface plasmons are along the top and bottom surfaces of the thin film NFT disc 202. Specifically, if the NFT is a local surface plasmon resonator type NFT, the cylindrical area 206 along the edge and the circular area 208 at the center of the disc 202 are the areas with high electron density. In an alternative implementation, where the NFT is utilizing traveling surface plasmons, the electrons create a large electron charge density in the center region 208 that propagates outwards in all directions in the form of plasmons. On the other hand the cylindrical area 210 is an area of low electron density. The direction of the waves of surface plasmons is along the surface of the disc from the center of the disc 212 towards the edges of the disc.

In one implementation of the NFT, the surface plasmons generated in the disc 202 are provided radial momentum by a current such that the electrons flowing into the disc 202 loose some of their momentum parallel to the surface of the NFT. For example, current may be passed through the center of the disc 202 in the direction 222 as illustrated in FIG. 2. In such an implementation, a current carrying conductor 214, 224 passing through the center of the disc 202 is provided. The current flowing through the conductor 224 imparts momentum to the surface plasmons in the center region 208 of the disc 202. As a result, the amplitudes of the surface plasmon waves from the center region 208 travelling towards the outer regions are enhanced.

Figure 3:
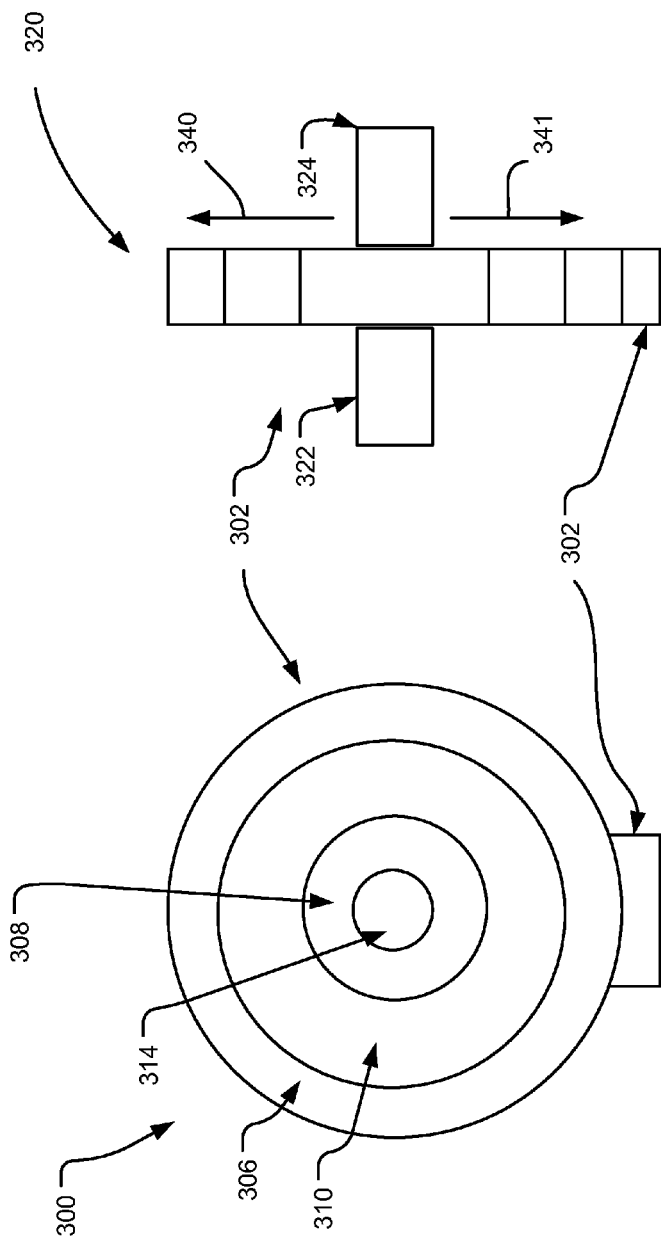
FIG. 3 illustrates cross-sectional views of an alternative example of NFT implementation disclosed herein.

FIG. 3 illustrates cross-sectional views of an alternative example of NFT implementation disclosed herein. Specifically, FIG. 3 illustrates a top-down view 300 and a cross-sectional view 320 of a lollipop NFT. The NFT illustrated in FIG. 3 is a disc/pin or lollipop type NFT that includes a disc 302 and a pin 304. The disc 302 may be made of a thin film structure. The NFT illustrated in FIG. 3 has the surface plasmons excited in a cylindrical mode. In this mode, the surface plasmons are along the top and bottom surfaces of the thin film NFT disc 302. Specifically, the cylindrical area 306 along the edge and the circular area 308 at the center of the disc 302 are the areas with high electron density or high surface plasmons. On the other hand the cylindrical area 310 is an area of low electron density. The direction of the waves of surface plasmons is along the surface of the disc from the center of the disc 312 towards the edges of the disc.

In one implementation of the NFT, the surface plasmons generated in the disc 202 are provided radial momentum by placement of electrodes at or near the center of the disc 312. For example, FIG. 3 illustrates electrodes 322 and 324 that are placed at or near the center of the disc 312. Furthermore, the placement of the electrodes 322 and 324 may be varied to impose a spatial coherence whereby only one particular standing plasmon wave is excited with a particular wave and energy. This allows electrodes 322, 324 to be connected to various different locations on the NFT. In an implementation where the electrodes are supplying current in phase, this electrodes may be located an integral number of plasmon wavelengths apart. On the other hand, if the electrodes are supplying a current that is 180° out of phase, then the electrodes may be located at locations that are odd integrals of one-half plasmon wavelength apart.

In one alternative implementation, the voltage applied to the electrodes 322 and 324 is sufficiently large to excite a particular plasmon mode. The amount of voltage applied to the electrodes 322 and 324 may depend on the current supplied to the electrode 322 and 324. For example, when large amount of current is applied to the electrodes 322 and 324, lower amount or voltage is required. In other words, the amount of momentum required for the electrons can be generated based on combination of current and voltage, with higher current levels requiring low voltage levels and lower current levels requiring higher voltage levels. Yet alternatively, the voltage applied to the electrodes 322 and 324 is selected such that only the desired wave has an integer relation between the wavelength of the plasmon wave and the dimensions of the NFT. In this case, other potential plasmon waves that do not have integer relation between its wavelength and the dimensions of the NFT are not excited.

In an alternative implementation, the placement of electrodes with respect to the NFT is selected to exploit the tunneling cone effect in generating plasmons with an intended wave vector. For example, as illustrated in FIG. 3, when the electrodes 322 and 324 are positioned near the center of the disc 302, the wave vectors of the tunneling electrons generated by the electrodes 322 and 324 are predominantly perpendicular to the tunneling barrier generated by the electrodes. Thus, the direction of the tunneling electron wave vectors are in the direction represented by arrows 340 and 341. As such, these vectors are generally collinear with the plasmon wave vectors in the disc 302 and therefore the tunneling electron wave vectors reinforces the plasmon wave vectors. Thus, spatial coherence between the tunneling electron wave vectors and the plasmon wave vectors is generated by selectively placing the electrodes with respect to the disc 302.

Figure 4:
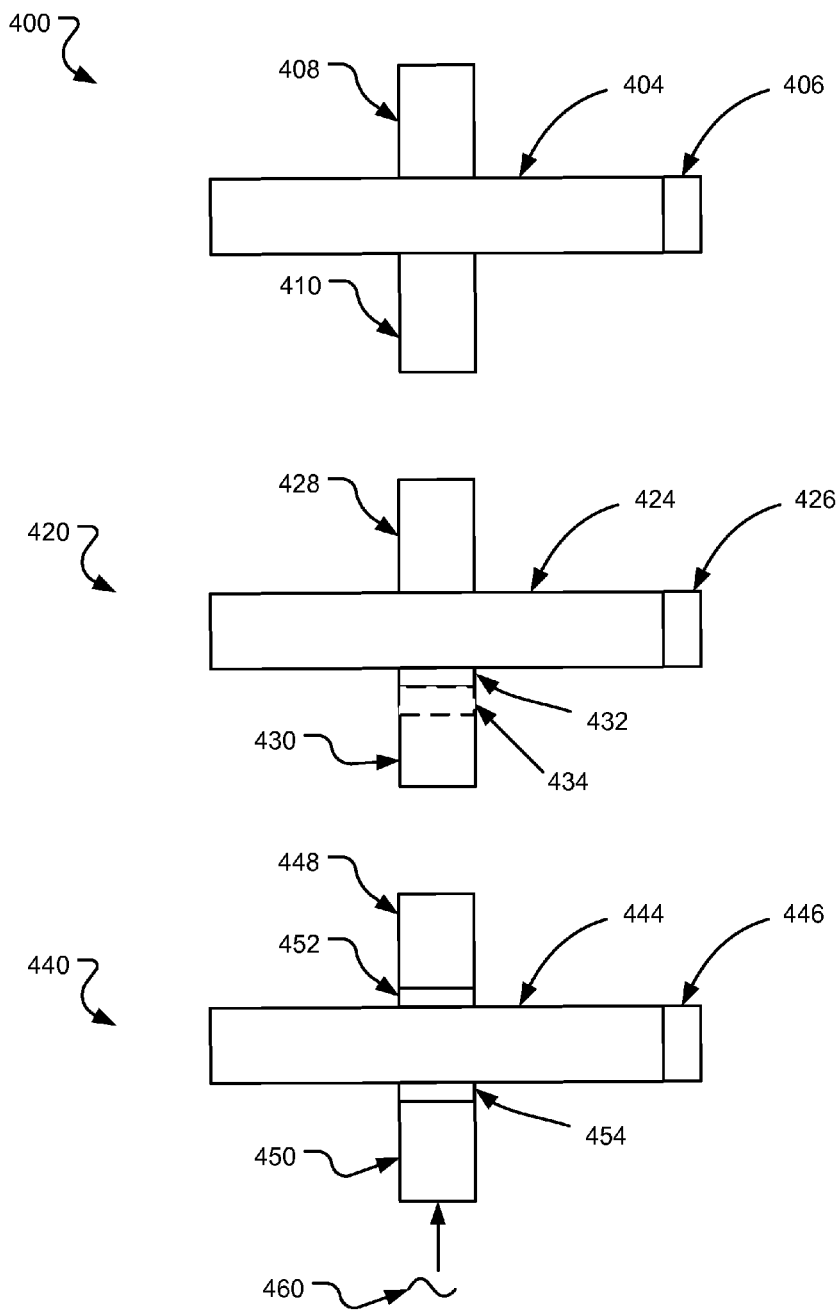
FIG. 4 illustrates various alternative implementation of NFT with tunneling barriers and electrodes placed in the vicinity of the NFT

FIG. 4 illustrates various alternative implementation of NFT with tunneling barriers and electrodes placed in the vicinity of the NFT. Specifically, the implementation 400 includes an NFT having a disc 404 and a peg 406. Electrodes 408 and 410 are provided on the opposite sides of the disc 404. In the implementation, the electrodes 408 and 410 are located proximate to the center of the disc 404 such that no tunneling barrier is provided between the electrodes 408, 410 and the disc 404.

The implementation 420 illustrates existence of a depletion region on an electrode attached to a disc of an NFT. Specifically, the implementation 420 includes an NFT having a disc 424 and a peg 426. The implementation 420 also includes electrodes 428 and 430 located near the center of and on the opposite sides of the disc 424. The electrodes 428 and 430 may be made of metal, semiconductor material, semi-metal material, etc. The selection of the material for the electrodes 428 and 430 determines a depletion region in the electrode and the buildup of charge on the electrodes 428 and 430. For example, the selection of semi-metal material such as germanium, silicon, arsenic, etc., for the electrodes 428 and 430 may provide a depletion region in the electrodes to create a tunneling barrier between the electrodes 428 and 430 and the disc 424. In this implementation, a tunneling barrier 432 is created adjacent to the disc 424.

In the implementation 420, the metal of the electrode 430 is selected to be such that a depletion region 434, where the electric charge is depleted, is created in the electrode 430. Specifically, when the surface plasmons are generated in the disc 424, the charge density within the electrodes goes through oscillations of high charge density and low charge density in the vicinity of the tunneling barrier 432. When there is high electron charge density in the disc 424, this charge creates the depletion region in the electrode 430. In this case, the probability of tunneling through the tunneling barrier 432 is decreased. On the other hand, when there is low electron charge density in the disc 424, there will be no depletion region 434. On the other hand, there is a charge build up in the electrode 430 near the tunneling barrier 432. Such build up of the charge in the electrode 430 near the tunneling barrier 432 increases the probability of tunneling through the tunneling barrier 432.

Such relation between the build up of charge in the disc 424 and the tunneling through the tunneling barrier 432 in effect locks in the phase between the wave of the electron tunneling and the waves of the surface plasmons in the disc 424. This is one manner in which a temporal coherence is effected between the wave of electron tunneling and the wave of surface plasmons within the disc 424. Such temporal coherence also simulates emission of electrons from the electrode 430 into the disc 424 in a synchronized manner.

The implementation 440 includes an NFT having a disc 444 and a peg 446 and electrodes 448 and 450. Compared to the implementations 400 and 420, the implementation 440 provides tunneling barriers 452 and 454 on each side of the disc 444. While not illustrated herein, the electrodes 448 and 450 collectively may be used to generate tunneling through the tunneling barriers 452 and 454 and to impose a temporal coherence between the wave of electron tunneling and the wave of surface plasmons within the disc 444.

Another manner in which a temporal coherence is achieved is to inject a fast current pulse in one or more of the electrodes attached to the NFT. Thus, for example, for the implementation 440, a fast current pulse 460 may be applied to the electrode 450 to provide an impulse stimulus that creates a large population of coherent surface plasmons in the disc 444. In one implementation, a series of multiple pulses may be applied.

The implementation 440 also provides another manner for providing temporal coherence between the wave of the electron tunneling and the wave of the surface plasmon through the NFT. Specifically, the electrode 448 opposite the electrode 450 may be used as a counter electrode and also connected to the NFT via the tunneling barrier 452. In one implementation, the tunneling barrier 452 confines the excited tunneling electrons—that are injected into the disc 444 by the electrode 450—into the disc 444 and substantially reduces the available number of states for the disc surface plasmons to relax into. As the number of available states decreases, the tunneling rate decreases. Furthermore, the surface plasmon, which represents increased or decreased density of electrons, also affects the tunneling rate. Thus the tunneling rate is in phase with the surface plasmon.

Figure 5:
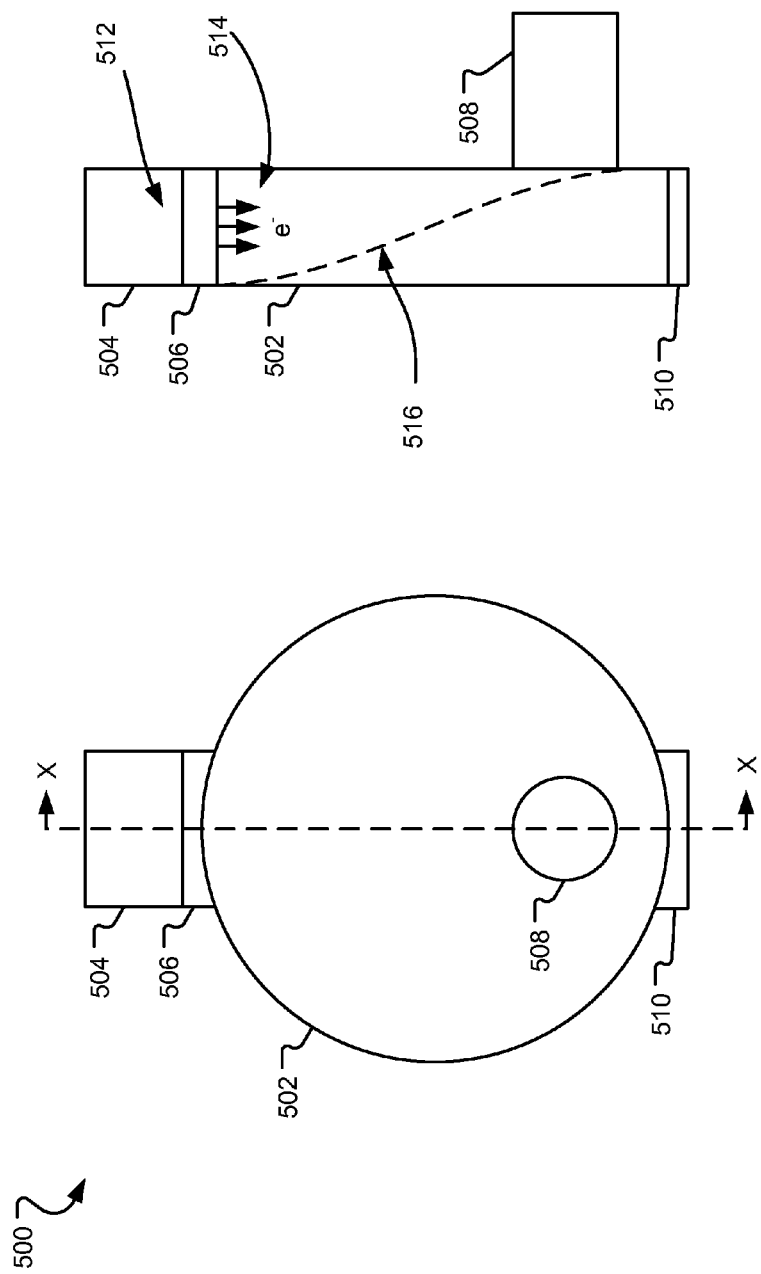
FIG. 5 illustrates an alternative implementation of an NFT wherein the tunneling effect is used to enhance the surface plasmons generated by a light radiating into the NFT.

FIG. 5 illustrates an alternative implementation 500 of an NFT wherein the tunneling effect is used to enhance the surface plasmons that are generated by a light radiating into the NFT 500. The implementation 500 may also be referred to as surface plasmon amplification by stimulated electron tunneling (SPASET). In the illustrated implementation an NFT 502 is provided with a first electrode 504 connected to the top of the NFT 502. Specifically, the first electrode 504 is connected to the NFT 502 via a tunneling barrier 506. A second electrode 508 may be connected to the disc 502 at some other location, such as on a side surface of the disc 502. While the second electrode 508 is connected in proximity to a peg 510, in an alternative implementation, the second electrode 508 may also be connected at other location that is more proximate to the first electrode 504. FIG. 5 also illustrates a cross-sectional diagram 520 of the NFT 500 along the lines XX.

In the implementation of FIG. 5, the surface plasmons can be generated in the NFT 502 by tunneling electron through the tunneling barrier 506. The tunneling of electrons through the barrier 502 stimulates the surface plasmons in the NFT 502. FIG. 5 illustrates the electron charge buildup in the region 512 causes the wave of tunneling electrons 514 through the NFT 502. The electron charge density in the NFT 502 decreases away from the tunneling barrier 506, as illustrated by the line 516.

While the implementation in FIG. 5 has the NFT in the form of a lollipop NFT structure, alternatively, the disc portion of the NFT 502 may also be rectangular, or of another shape.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims. Although the present invention has been described with reference to preferred embodiments, workers skilled in the art will recognize that changes may be made in form and detail without departing from the scope of the invention. The implementations described above and other implementations are within the scope of the following claims.

What is claimed is:

1. A device comprising:
a near field transducer (NFT); and
electrodes configured to at least one of generate or enhance surface plasmons in the NFT by passing an electrical current through a portion of the NFT, wherein the NFT comprises a combination of a disc and peg and each of the electrodes is located on opposite surfaces of the disc.

2. The device of claim 1, wherein the electrodes are further configured to generate surface plasmons by passing the electrical current substantially through a center of the NFT.

3. The device of claim 1, wherein one of the electrodes is electrically connected to the NFT via a tunneling barrier.

4. The device of claim 3, wherein the one of the electrodes is separated from the tunneling barriers by a depletion region.

5. The device of claim 1, wherein the NFT comprises a combination of a disc and peg and wherein a first of the electrodes is connected to a side of the disc and a second of the electrodes is connected to a periphery of the disc.

6. The device of claim 5, wherein the first of the electrodes is connected to the side of the disc closer to the peg compared to the second of the electrodes.

7. The device of claim 3, wherein the NFT is a lollipop type NFT including a disc and a peg and the tunneling apparatus is further configured to substantially excite only one standing plasmon wave in the NFT.

8. The device of claim 3, wherein the tunneling apparatus is further configured to lock the phase between the tunneling electrons and the electron wave of the surface plasmon in the NFT.

9. The device of claim 8, wherein the tunneling apparatus is further configured to lock the phase between the tunneling electrons and the electron wave of the surface plasmon in the NFT by creating a depletion region in one of the electrodes attached to the NFT.

10. The device of claim 8, wherein the tunneling apparatus is further configured to lock the phase between the tunneling electrons and the electron wave of the surface plasmon in the NFT by injecting a current pulse in one of the electrodes attached to the NFT.

11. A near field transducer (NFT) configured to have enhanced intensity of surface plasmons by having an electrical current passed through the NFT and configured to lock in the phase of the surface plasmons generated by the optical energy with the waves of electrons generated by the electrical current through the NFT.

12. The NFT of claim 11, wherein the NFT is configured to generate the surface plasmons by receiving optical energy from a waveguide.

13. The device of claim 11, wherein the NFT includes a disc and a peg and the electrical current is passed through the NFT via a first electrode attached at the center of the disc.

14. The device of claim 13, wherein the first electrode is attached to the disc using a tunneling barrier.

15. A device comprising:
a near field transducer (NFT) including a disc to receive optical energy and to convert the optical energy into waves of surface plasmons and a peg to generate heat in a recording media; and
a tunneling apparatus attached to the disc and configured to resonate the surface plasmons.

16. The device of claim 15, wherein the tunneling apparatus is further configured to resonate the surface plasmons by generating a wave of tunneling electrons in the disc wherein the phase of the wave of the tunneling electrons is synchronized with one of the waves of the surface plasmons.

17. The device of claim 16, wherein the tunneling apparatus comprises an electrode attached to the disc via a tunneling barrier.

18. The device of claim 17, wherein the electrode is configured to generate a depletion region on the electrode in presence of high electron charge density in the disc.

* * * * *